(12) United States Patent
Tang et al.

(10) Patent No.: US 7,526,271 B2
(45) Date of Patent: Apr. 28, 2009

(54) METHOD FOR IMPLEMENTING PREPAID MULTIMEDIA MESSAGING SERVICE

(75) Inventors: Fei Tang, Shenzhen (CN); Xiaobin Li, Shenzhen (CN); Xuetao Xu, Shenzhen (CN); Weishu Yang, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 11/127,761

(22) Filed: May 11, 2005

(65) Prior Publication Data

US 2005/0276402 A1 Dec. 15, 2005

Related U.S. Application Data

(63) Continuation of application No. PCT/CN03/00087, filed on Oct. 22, 2003.

(30) Foreign Application Priority Data

Nov. 12, 2002 (CN) ................ 02 1 49288

(51) Int. Cl.
*H04M 11/00* (2006.01)
(52) U.S. Cl. .............. 455/406; 455/407; 455/408
(58) Field of Classification Search ......... 455/406–408, 455/445; 379/114.28
See application file for complete search history.

(56) References Cited

U.S. PATENT DOCUMENTS

| | | | | |
|---|---|---|---|---|
| 5,946,380 A | * | 8/1999 | Cohen et al. | 379/127.01 |
| 6,249,681 B1 | * | 6/2001 | Virtanen | 455/466 |
| 6,848,008 B1 | * | 1/2005 | Sevanto et al. | 709/249 |
| 2001/0029174 A1 | * | 10/2001 | Herajarvi et al. | 455/406 |
| 2001/0039191 A1 | | 11/2001 | Maierhofer | |
| 2001/0053687 A1 | * | 12/2001 | Sivula | 455/412 |
| 2002/0128912 A1 | * | 9/2002 | Vindeby | 705/16 |
| 2003/0199265 A1 | * | 10/2003 | Aoyama et al. | 455/406 |
| 2004/0141601 A1 | * | 7/2004 | Cai et al. | 379/114.2 |
| 2005/0009500 A1 | * | 1/2005 | Ear | 455/408 |
| 2005/0083940 A1 | * | 4/2005 | Eales et al. | 370/395.2 |

FOREIGN PATENT DOCUMENTS

CN 1340956 A 6/1999

(Continued)

OTHER PUBLICATIONS

3GPP, Jun. 2003, MMS Functional Description Stage 2, p. 13, 45.*

(Continued)

*Primary Examiner*—Lester Kincaid
*Assistant Examiner*—Steven Lim
(74) *Attorney, Agent, or Firm*—Christie, Parker & Hale, LLP (57) ABSTRACT

Disclosed is a method for implementing prepaid MMS under the condition that the SCP in which the prepaid subscribers register can provide both prepaid service and prepaid MMS. The method comprises the following steps: a calling subscriber submitting a multimedia message to a MMSC; the MMSC judging the addresses of the calling subscriber and the called subscriber who will receive the multimedia message to determine user types of the calling subscriber and the called subscriber; and the originator MMSC or the recipient MMSC implementing charge processing and distribution of the multimedia message through sending a charge request message to SCP based on the user types.

28 Claims, 5 Drawing Sheets

FOREIGN PATENT DOCUMENTS

| | | | |
|---|---|---|---|
| CN | 1239850 | A | 12/1999 |
| CN | 1239850 | A | 6/2000 |
| CN | 1327324 | A | 8/2000 |
| CN | 1327234 | A | 12/2001 |
| CN | 1340956 | A | 3/2002 |

OTHER PUBLICATIONS

3GPP, Sep. 2001, Charging data description for application services, p. 5.*

3GPP, TS 23.140, version 4.2.0 Release 4.*

International Search Report of corresponding PCT/CN2003/00887, dated Feb. 26, 2004.

Thai Office action dated Jun. 23, 2007 with partial English translation.

Russian Office action dated Jul. 28, 2006 for PCT/CN2003/00087, with partial English translation.

* cited by examiner

METHOD FOR IMPLEMENTING PREPAID MULTIMEDIA MESSAGING SERVICE

CROSS-REFERENCE TO RELATED APPLICATIONS

This application is a Continuation Application of International Application Number PCT/CN2003/00087, filed on Oct. 22, 2003, which claims priority of Chinese Patent Application Number 02149288.3, filed on Nov. 12, 2002.

FIELD OF THE TECHNOLOGY

The present invention relates to prepaid service, and more particularly to a method for implementing a prepaid Multimedia Messaging Service (MMS).

BACKGROUND OF THE INVENTION

As development of Short Messaging Service (SMS) and Enhanced Messaging Service (EMS), MMS provides a complete end-to-end solution for personal multimedia mobile communication services. In terms of communication content, multimedia messages include images, audios, videos and data, etc.; and in terms of function, MMS covers multimedia message communications from terminal to terminal, from terminal to application and from application to terminal. With MMS, not only communications between terminals and between terminal and application can be realized, but also the diversity of contents, including different combinations of pictures, voices, images, data and texts, can be realized. As an open media service access platform, MMS can be used to derive rich and colorful content service applications through interactions between mobile users and Internet content providers. During this process, the users act not only consumers of MMS, but also content developers, so the interests of terminal users for employment of the service will be undoubtedly raised.

The prepaid MMS has been treated as one of important services to start and develop 2.5G and 3G data service. The prior prepaid MMS adopts Wireless Application Protocol (WAP) events to deal with the procedures. In prior prepaid MMS, information is actively obtained from multimedia message centers by recipients, which is the same as the browsing or downloading method in WAP and different from SMS in network architecture and charge mode.

The subscribers of prepaid MMS form an important part of mobile users. The prepaid MMS aims to provide complete MMS for prepaid users, making mobile users of prepaid MMS be able to enjoy various MMSs at anytime and anywhere as postpaid subscribers do.

About prepaid MMS, the specification of the Third Generation Partnership Project (3GPP) describes as follows.

The Multimedia Messaging Service Center (MMSC) can support prepaid MMS. When a calling subscriber submits a multimedia message, if the originator MMSC confirms that the originator of the multimedia message is a prepaid MMS subscriber, the originator MMSC will transmit a charge request to a Service Control Point (SCP) and carry out authentication and charge verification. If there is no enough account balance for the subscriber to pay for the multimedia message, the originator MMSC can deny the message. The specific standards to determine whether the account balance is enough to pay for the multimedia message are based on following terms: total size of the multimedia message, type of content, configuration of message elements and type of abstract message.

Procedure of authentication and charge verification made in originator MMSC is as follows. At first, SCP makes authentication on MMSC. If the calling subscriber is a terminal user or an E-mail address user, then the charge rate will be designated by MMSC, and SCP will make verification and deduction according to the charge rate and payable balance of the calling subscriber. If the calling subscriber is a user of Value Added Service Provider (VASP), then the charge rate and charge mode will be determined by VASP, and SCP will make verification and deduction according to the charge rate, the charge mode and payable balance of the calling subscriber.

Once the multimedia message is refused, the originator MMSC should prompt originator MMS terminal with response of suitable status value, and the MMS terminal should prompt the subscriber to pay attention to the message. If authentication for the multimedia message from originator made by SCP is successful, then SCP will ask the MMSC to distribute the message.

When extracting the multimedia message, the recipient MMSC will confirm whether the recipient of the multimedia message is a prepaid MMS user firstly, and check account balance for the confirmed subscriber. The checking operation can be implemented at the time when the multimedia message arrives the recipient MMSC, at this time, the MMSC can deny or accept the multimedia message according to the checking result. Even the multimedia message is accepted, it is not certain whether the multimedia message has been checked in advance, so the MMSC can also check the account balance when the recipient MMS terminal sends an extracting request, wherein the checking is based on the same standard as that while sending messages. If the multimedia message cannot be extracted because of no enough account balance, the recipient MMSC should prompt the recipient MMS terminal with response of suitable status value, and the recipient MMS terminal will remind the subscriber to pay attention to the message. Otherwise, the multimedia message will be sent to the recipient MMS terminal.

After sending the message to the recipient MMS terminal, the MMSC will send a charge confirmation request to SCP, in order to enable SCP to implement the accurate charge operation.

The specifications on prepaid MMS in 3GPP are relatively simple, only some fundamental principles about prepaid MMS are described on the whole, but no further solution on methods for prepaid MMS is provided. Some of its defects are listed as follows.

(1) There is no corresponding specification on prepayment interface for prepaid MMS, that is, there is no interface protocol and definition of message architecture about the interface between MMSC and SCP.

(2) The problems of message interacting procedure keep unsolved between terminal and terminal, or terminal and VASP application in prepaid MMS.

(3) The charge problems on the prepaid MMS are only skimmed over in 3GPP, without any perfect solution on charge mechanism for prepayment being provided.

SUMMARY OF THE INVENTION

It is an object to provide a method for implementing a prepaid MMS in order to solve the disadvantages of the prior art.

Under the condition that the MMS subscriber is a prepaid subscriber and the SCP in which the prepaid MMS subscriber registers can provide both prepaid service and prepaid MMS, the method according to the present invention comprises at least the following steps:

A) a calling subscriber submitting a multimedia message to a MMSC;

B) the MMSC judging the addresses of the calling subscriber and the called subscriber who will receive the multimedia message, and determining whether a user type of each of the calling subscriber and the called subscriber is terminal or application; and C) based on the user types of the calling subscriber and the called subscriber, the originator MMSC and/or the recipient MMSC implementing charge processing for the calling subscriber and the called subscriber and distribution of the multimedia message through sending a charge request message to a Service Control Point (SCP).

In the above method, the step C further comprises:

C1) judging whether both the calling subscriber and the called subscriber are terminals and register in the same MMSC, if so, going to step C2; otherwise, if the calling subscriber and the called subscriber are terminals and register in different MMSCs, then going to step C3; if the calling subscriber is terminal and the called subscriber is application, then going to step C4; if the calling subscriber is application and the called subscriber is terminal, then going to step C5;

C2) the MMSC in which both the calling subscriber and the called subscriber register distributing the multimedia message, and sending an authentication and charge request message to the SCP to implement charge processing for the calling subscriber and the called subscriber, and then going to step C6;

C3) the recipient MMSC distributing the multimedia message, the originator MMSC sending authentication and charge request messages to the SCP to implement charge processing for the calling subscriber, and the recipient MMSC sending authentication and charge request messages to the SCP to implement charge processing for the called subscriber, and then going to step C6;

C4) the originator MMSC distributing the multimedia message, and sending an authentication and charge request message to the SCP to implement charge processing for the calling subscriber, and then going to step C6;

C5) the recipient MMSC distributing the multimedia message, and sending an authentication and charge request message to the SCP to implement charge processing for the called subscriber, and then going to step C6; and C6) the originator MMSC returning a delivery report to the calling subscriber.

In the above method, the step C2 further comprises:

C21) the MMSC sending an authentication and charge request message for the originator to the SCP, the SCP then implementing authentication and prepayment operation for the originator, and returning an authentication and charge request response message to the MMSC;

C22) the MMSC sending an authentication and charge request message for the recipient to the SCP, the SCP then implementing authentication and prepayment operation for the recipient, and returning an authentication and charge request response message to the MMSC;

C23) the MMSC distributing the multimedia message to the called subscriber;

C24) after confirming that the called subscriber has received the multimedia message, the MMSC sending charge confirmation request for recipient to the SCP, the SCP making verification and subtraction for traffic, and returning charge confirmation request; and C25) after confirming that the called subscriber has received the multimedia message, the MMSC sending a charge confirmation request for originator to the SCP, the SCP implementing verification and subtraction for traffic, and returning a charge confirmation request response to the MMSC.

In the above method, the step C3 further comprises:

C31) the originator MMSC sending an authentication and charge request message for the originator to the SCP, the SCP then implementing authentication and prepayment operation for the calling subscriber, and returning an authentication and charge response message to the MMSC;

C32) the originator MMSC forwarding the received multimedia message to the recipient MMSC;

C33) the recipient MMSC sending an authentication and charge request message for the recipient to the SCP, the SCP then implementing authentication and prepayment operation for the called subscriber, and returning an authentication and charge request response message to the recipient MMSC;

C34) the recipient MMSC distributing the received multimedia message to the called subscriber;

C35) after confirming that the called subscriber has received the multimedia message, the recipient MMSC sending a charge confirmation request message for the recipient to the SCP, the SCP implementing verification and subtraction for traffic, and returning a charge confirmation request response message to the recipient MMSC;

C36) the recipient MMSC sending a forwarding delivery report to the originator MMSC; and C37) after confirming that the called subscriber has received the multimedia message, the originator MMSC sending a charge confirmation request message for originator to the SCP, the SCP confirming deduction operation and implementing verification and subtraction for traffic, and returning a charge confirmation request response message to the originator MMSC.

In the above method, the step C4 further comprises:

C41) the MMSC sending an authentication and charge request message for the originator to the SCP, the SCP then implementing authentication and prepayment operation and returning an authentication and charge request response message to the MMSC;

C42) the MMSC sending the multimedia message to an application; and

C43) after confirming that the application has received the multimedia message, the MMSC sending a charge confirmation request message for originator to the SCP, the SCP implementing deduction operation and implementing verification and subtraction for traffic, and returning a charge confirmation request response message to the MMSC.

In the above method, the step C5 further comprises:

C51) the recipient MMSC sending an authentication and charge request message for the recipient to the SCP, the SCP then implementing authentication and prepayment operation and returning an authentication and charge request response message to the recipient MMSC;

C52) the recipient MMSC distributing the multimedia message to the called subscriber; and C53) after confirming that the called subscriber has received the multimedia message, the recipient MMSC sending a charge confirmation request message for the recipient to the SCP, the SCP implementing verification and subtraction for traffic, and returning a charge confirmation request response message to the recipient MMSC.

In the above method, the authentication and charge request message may include one or more than one of the following fields: dialogue ID, identification of content provider, service code and business code, message ID, identification of the original originator MMSC forwarding the multimedia message, identification of the originator or recipient MMSC sending charge request to SCP, priority of the multimedia message, type of the multimedia message destination number, coding plan of the multimedia message destination number, address of the multimedia message destination number, charge number, charge rate, charge type, bill type and discount. The authentication and charge request response message may include dialogue ID and the field indicating success or failure of charge operation.

In the above method, the charge confirmation request message may include one or more than one of the following fields: dialogue ID, message ID, the number of mobile phone to be charged, address of the multimedia message destination number, status value indicating success or failure of sending the multimedia message, identification of the originator or recipient MMSC sending charge request to SCP and the traffic size of the content. The charge confirmation request response message may include dialogue ID and the field indicating success or failure of charge operation.

The above method may further comprise: the originator or recipient MMSC terminating providing service to the current multimedia message and sending a delivery report to the calling subscriber if it did not receive the authentication and charge request response from the SCP in preset time period after sending the authentication and charge request to the SCP.

The above method may further comprise: the originator or recipient MMSC setting the "symbol of charge confirmation" field in the bill at "unconfirmed" and processing the multimedia message in the way of non-prepaid MMS subscriber if it did not receive the charge confirmation request response message.

The charge mechanisms in the present invention include: deducting information fee charged by piece real-time, deducting monthly fee real-time, authenticating the mobile phone account to be charged, checking whether the charge by piece is repeated, checking whether the charge by month is repeated, checking quota of single consumption by piece, checking quota of consumption by month, request for charge confirmation, supporting services with ceiling charge and monthly charge, as well as traffic verification and extracting when charge by piece, etc.

The present invention provides an effective solution for prepaid MMS, which can solve the problem about prepayment interface in prepaid MMS, i.e., solve the problem about interface protocol between MMSC and SCP and definition of message structure.

The present invention can realize the service processing of message interaction between terminal and terminal or terminal and application in prepaid MMS also. In addition, it solves the problem about charge principle for prepaid MMS and the problem about how to realize charge mechanism for prepaid MMS. On the whole, the present invention provides an excellent technical solution for the smooth development of the prepaid MMS.

DETAILED DESCRIPTION OF THE INVENTION

The invention will be described in more detail hereinafter with reference to the drawings and embodiments.

Figure 1:
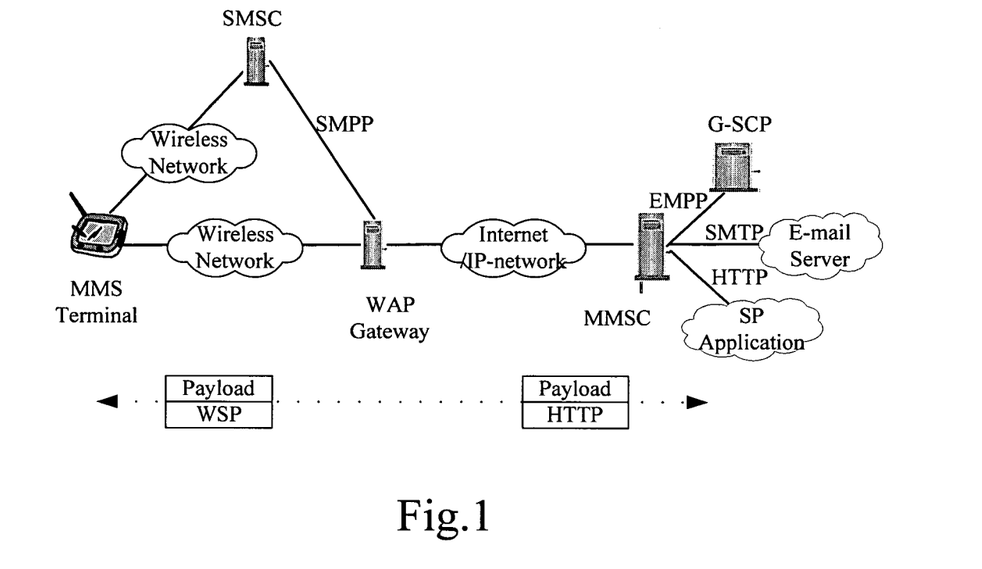
FIG. 1 is a block diagram illustrating the network architecture of a prepaid system.

FIG. 1 is a block diagram illustrating the network architecture of a prepaid system. As shown in FIG. 1, the interaction protocols between MMSC and relevant network devices can be sorted into following types: EMPP protocol adopted between MMSC and SCP G-SCP, which is a long range connection; SMTP protocol adopted between MMSC and application devices with E-mail address; HTTP protocol adopted between MMSC and applications of service provider (SP); Internet protocol such as HTTP protocol adopted between MMSC and WAP gateway.

In this embodiment, EMPP protocol is adopted to communicate between MMSC and SCP, and further to accomplish the function of prepayment interface in prepaid MMS.

The prepaid MMS in the embodiment mainly aims to overcome the limitations of that in prior art. In principle, the account of the prepaid MMS subscriber should be situated at the SCP in which the prepaid subscriber registers, meanwhile, the SCP should provide at least prepaid service and prepaid MMS at the same time.

The definition on the protocol structure of the interface message between MMSC and SCP according to the present invention is shown in Table 1 to Table 4.

Authentication and charge request message (MM_Charge.req):

TABLE 1

| MM_Charge.req | Message field | Notes |
|---|---|---|
| | Tsct-id | Dialogue ID, used for interaction of messages |
| | Vasp-id | Identification of content provider |
| | Sp-id | Service code + business code |
| | msg-id | Message ID, generated by MMSC, being a decimal digital character string |
| | src-mmsc | Identification of the original MMSC forwarding the multimedia message |
| | gw-mmsc | Identification of the MMSC sending charge request to SCP |

TABLE 1-continued

| MM_Charge.req | Message field | Notes |
|---|---|---|
| | pri | Priority of multimedia message |
| | Charge-date | Charging date, indicating the duration of the charge, whose format is year + month. When the type is monthly charge, the value of month is 1-12; when the type is charge by piece, inquiring by month or ceiling charge, the value is zero |
| addr of sub-element | ton | Type of the multimedia message destination number |
| | npi | Coding plan of the multimedia message destination number |
| | Val | Address of the multimedia message destination number. The MMSC fills in the subscriber number of destination called terminal of the multimedia message |
| chg-info of sub-element | Msid | Charge number, i.e., mobile phone number of the prepaid MMS subscriber sending the multimedia message |
| | Rate | Charge rate, with minute as its unit. The MMSC sets charge rate of multimedia message for the prepaid MMS subscriber here. It can be empty, then the subscriber will be charged according to the SCP charge rate |
| | Type | Charge type. Value label: 1: free; 2: charge by piece; 3: monthly charge; 4: ceiling charge |
| | Cdrtype | Bill type. Value label: 1: MO uplink charge; 2: MT downlink charge; 3: MMC charge |
| | discount | Discount, the fee charged in practice being charge rate × discount/100 |

Authentication and charge request response message (MM_Charge.res):

TABLE 2

| MM_Charge.res | Message field | Notes |
|---|---|---|
| | Tsct-id | Dialogue ID, used for interaction of messages; corresponding to the message MM_Charge.req |
| | stat | Indicating whether charge operation is successful or not, referring to EMPP protocol for error codes |

Charge confirmation request message (MM_Confirm.req):

TABLE 3

| MM_Confirm.req | Message field | Notes |
|---|---|---|
| | Tsct-id | Dialogue ID, used for interaction of messages |
| | msg-id | Message ID, corresponding to msg-id in sm-chg-req |
| | Msid | The number of the mobile phone to be charged |
| | Val | Address of the multimedia message destination number, which is filled with the subscriber number of destination called terminal of the multimedia message by MMSC |
| | Mstat | Status value indicating whether the multimedia message has been sent successfully. Value label: 0: failed in sending the multimedia message; 1: successful in sending multimedia message |
| | Gw-mmsc | Identification of the MMSC sending charge request to SCP |
| | Data-length | Indicating traffic of the message, with byte as unit |

Charge confirmation request response message (MM_Confirm.res):

TABLE 4

| MM_Confirm.res | Message field | Notes |
|---|---|---|
| | Tsct-id | Dialogue ID, used for interaction of messages, corresponding to the message MM_Confirm.req |
| | stat | Indicating whether charge operation is successful or not, referring to EMPP protocol for error codes |

With the help of the forgoing four complete message protocol interfaces, the message interaction between MMSC and SCP can be realized, and further the prepaid function for multimedia messages can be accomplished.

Figure 2:
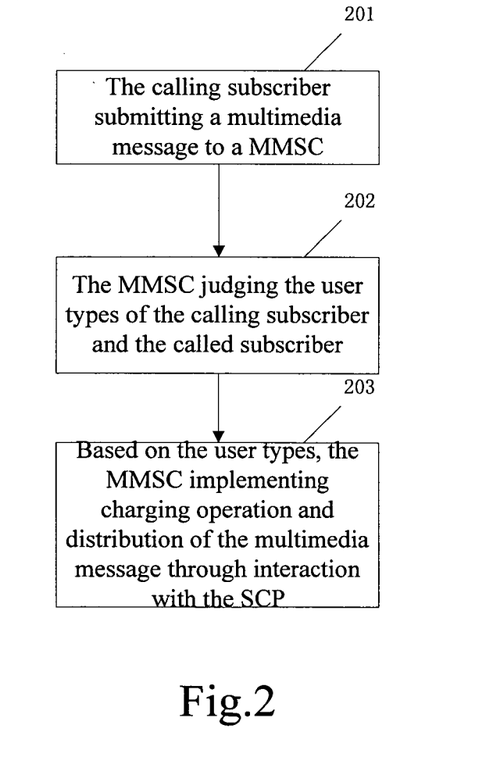
FIG. 2 is a main flow diagram of the invention.

FIG. 2 is a main flow diagram according to the present invention. Referring to FIG. 2, the method according to the present invention comprises the following steps.

In step 201, the prepaid calling subscriber submits a multimedia message to a MMSC.

In step 202, the MMSC charges the addresses of the calling subscriber and the called subscriber who will receive the multimedia message so as to determine the types of subscribers.

The originator MMSC obtains the addresses of the calling subscriber and the called subscriber according to the messages sent by the prepaid calling subscriber, and determines user types of these two subscribers together with the recipient MMSC based on the addresses. The calling subscriber and the called subscriber can be in the same MMSC, or in different MMSCs. The user types can be sorted into terminal and application, wherein the terminal mainly refers to mobile terminal such as mobile phone, while application further includes SP application and E-mail address application. In this way, services from non-forwarding terminal to terminal, or from forwarding terminal to terminal, or from terminal to application, or even from application to terminal between the calling and called subscribers can be formed.

There are three kinds of rules to judge the terminal type:

1. Judging Rules for Mobile Terminal:

If the address string of a single address accords with the number address specification of E.164, that is the address string wholly comprises figures of 0~9 and legitimate characters such as "+" besides the possible "/TYPE=PLMN" character string at the tail, then the string can be primarily recognized as a PLMN number. After the terminal address has been judged as a PLMN number, it is necessary to make sure the routing extracted from the number part of the address string is not null and the length of the number is correct, if so, it is certain that the address is a legitimate address to mobile terminal.

2. Judging Rules for E-mail Address:

E-mail address must comply with the address criteria of RFC822, that means whenever there is a character of "@" in the string, character string before the "@" is the user name, and that after the "@" refers to domain name.

3. Judging Rules for SP Application:

The "address" of SP application must be a PLMN type address. If no routing can be extracted from the number part of the address string, or the length of the address does not match the length of standard mobile terminal number, then the address will be regarded as an address of SP application.

In step 203, according to the user type, the MMSC in which the users register initiates charge request to SCP, in order to complete charge process and distribution of the multimedia message.

Based on the results on terminal type determined in step 202, corresponding procedure is adopted. In this procedure, MMSC and corresponding SCP make interaction, and finally finish the operation of charging and distribution of multimedia message.

The interaction process between MMSC and SCP includes the following steps. First, after receiving a multimedia message, the MMSC sends an authentication and charge request message MM_Charge.req to a SCP, wherein the message has the structure shown in Table 1, and contains relevant control information. Then, the SCP figures out amount of the charge based on message fields of rate and discount, determines charge type according to the message field of type, and determines bill type and contents based on the message fields of cdrtype, Tsct-id, src-mmsc, gw-mmsc, pri, Charge-date, ton and npi. If there is no objection on the process of authentication and charge as well as prepayment, then SCP will return an authentication and charge request response message MM_Charge.res to the MMSC, wherein the response has the message structure stated in Table 2, and the message field of stat presents result of the charging operation. If the charging operation is successful, the MMSC will deliver the multimedia message to the called subscriber. After making sure the called subscriber has received the multimedia message, the MMSC will send charge confirmation request message MM_Confirm.req to SCP, wherein the request has the structure shown in Table 3. SCP withholds fees based on message field of Mstat, and then returns a charge confirmation request response message MM_Confirm.res to MMSC, wherein the request has the structure shown in Table 4, and the message field of stat shows the results of charge confirmation.

All mechanisms involved in the present invention for prepaid MMS include following:

1. Deducting Information Fee Charged by Piece Real-Time

In prepaid MMS, after the request for charging by piece sent by MMSC has been received, the status and balance of the prepaid MMS subscriber account will be checked, then deducting operation can be carried out after the check passes. Because of the characteristics of the prepaid MMS, MMSC should send charge request to SCP before forwarding the multimedia message.

2. Deducting Monthly Fee Real-Time

In prepaid MMS, after the request for deducting monthly fee sent by MMSC has been received, the status and balance of the prepaid MMS subscriber account will be checked, then deducting operation can be carried out after the check passes. The service provider or MMSC must submit monthly charging information before sending the first multimedia message under the service. When prepaid MMS multimedia messages are sent by mobile terminal of the called subscriber, the fee will be filled in monthly fee, but the fee for every multimedia message under prepaid MMS is zero for SCP.

3. Authenticating Account of the Mobile Phone to be Charged

In prepaid MMS, before deducting the fee by piece or by month from account of the prepaid MMS subscribers, the status and balance of the subscriber account will be checked, only the prepaid MMS subscriber whose account is in the period of validity and the account balance is more than or equal to the amount to be deducted at this time is qualified to go on with deducting operation. Otherwise, the multimedia message of the current prepaid MMS subscriber is not allowed to be sent.

4. Examining Whether the Charge by Piece is Repeated

In the period when no serial number of multimedia message (Msg-ID) is not repeated which is set by the service provider, for example, that the serial number of the multimedia message (Msg-ID) is not repeated in at least 72 hours is required, the SCP will check if the serial number of the multimedia message (Msg-ID), telephone number of mobile phone to be charged (Msid) and address of the recipient (Val) are exactly same with the charge request information in the period. If they are the same, the charge request will be denied by the prepaid MMS.

5. Examining Whether the Monthly Charge is Repeated

In the monthly charging period set by the service provider, for example, one month, SCP will check if the telephone number of mobile phone to be charged (Msid), address of the recipient (Val), enterprise identification (vasp-id) and service identification (sp-id) are exactly the same with the monthly charge request in the period. If they are same, then the monthly charge has been levied will be considered in the prepaid MMS.

6. Checking Quota of Single Consumption by Piece

In the process of charge by piece, service provider can flexibly set the maximum amount in each payment request. If the amount of payment request excesses the quota, the payment request will be denied in the prepaid MMS.

7. Checking the Quota of Monthly Consumption

In process of monthly charge, service provider can flexibly set the maximum amount in each payment request. If the amount of monthly payment request excesses the quota, the request will be denied in the prepaid MMS.

8. Request for Charge Confirmation, i.e., Complementary Payment Mechanism

Once the prepaid MMS subscriber makes use of prepaid MMS, no matter it is uplink communication fee or downlink information fee, MMSC must submit the prepayment to SCP, and confirm or implement complement prepayment based on the status report. Here, the MMSC to which the service provider connected initiates and sends the status report on uplink communication to the recipient MMSC; and the report on downlink is initiated by the recipient MMSC in order that the system can guarantee that no charge is omitted, nor fee from those who did not use the service is levied.

After receiving the status report sent by the MMSC of the other side, the MMSC to which the subscriber belongs should send a charge confirmation request message MM_Confirm.req to SCP. During the period for waiting status report set by the operator, such as 2 days, if SCP has not received the relevant request for charge confirmation, SCP should make complementary payment operation.

9. Service Mechanism Supporting Ceiling Charge and Monthly Charge

As for the service with ceiling charge mode, after the ceil is reached, the service provider will appoint the charge type as ceiling mode when it sends multimedia message to recipient, and SCP will not make authentication for the number to be charged, nor perform charge while handling such charge requests. The SCP only notes down a bill, and notifies the MMSC that the charge request is successful finished.

As for the service with monthly charge mode, after the monthly charge has been paid, the service provider will appoint charge type as monthly charge mode when it sends multimedia message to recipient. While handling this kind of charge request, SCP will not make authentication for the charge number, nor perform charge. The SCP only notes down a bill and notifies the MMSC that the charge request is successful finished.

10. Traffic Verification and Subtraction Mechanism when Charge by Piece

Under the condition that the prepaid MMS is implemented in the GPRS network, when the prepaid MMS charges by piece, namely, charges based on the content, the charge for traffic in the GPRS network generated by the multimedia message will not be levied from the subscriber. As for prepaid MMS subscriber, the charge for traffic and content is levied separately. Because it is impossible to distinguish which segment of traffic is incurred by the multimedia message while charge by traffic, the charge can be made only based on the traffic of the multimedia message. The method adopted here is complementing the traffic fee while charge for content.

In whichever process when charge by piece or by month, it is necessary for MMSC to report traffic size of the multimedia message in charge confirmation request message MM_Confirm.req, that is, message field (Data-length). SCP makes the complement for the subscriber's account based on the traffic.

Hereinafter, process for the four kinds of services, from non-forwarding terminal to terminal, from forwarding terminal to terminal, from terminal to application and from application to terminal, will be described respectively in detail.

Figure 3:
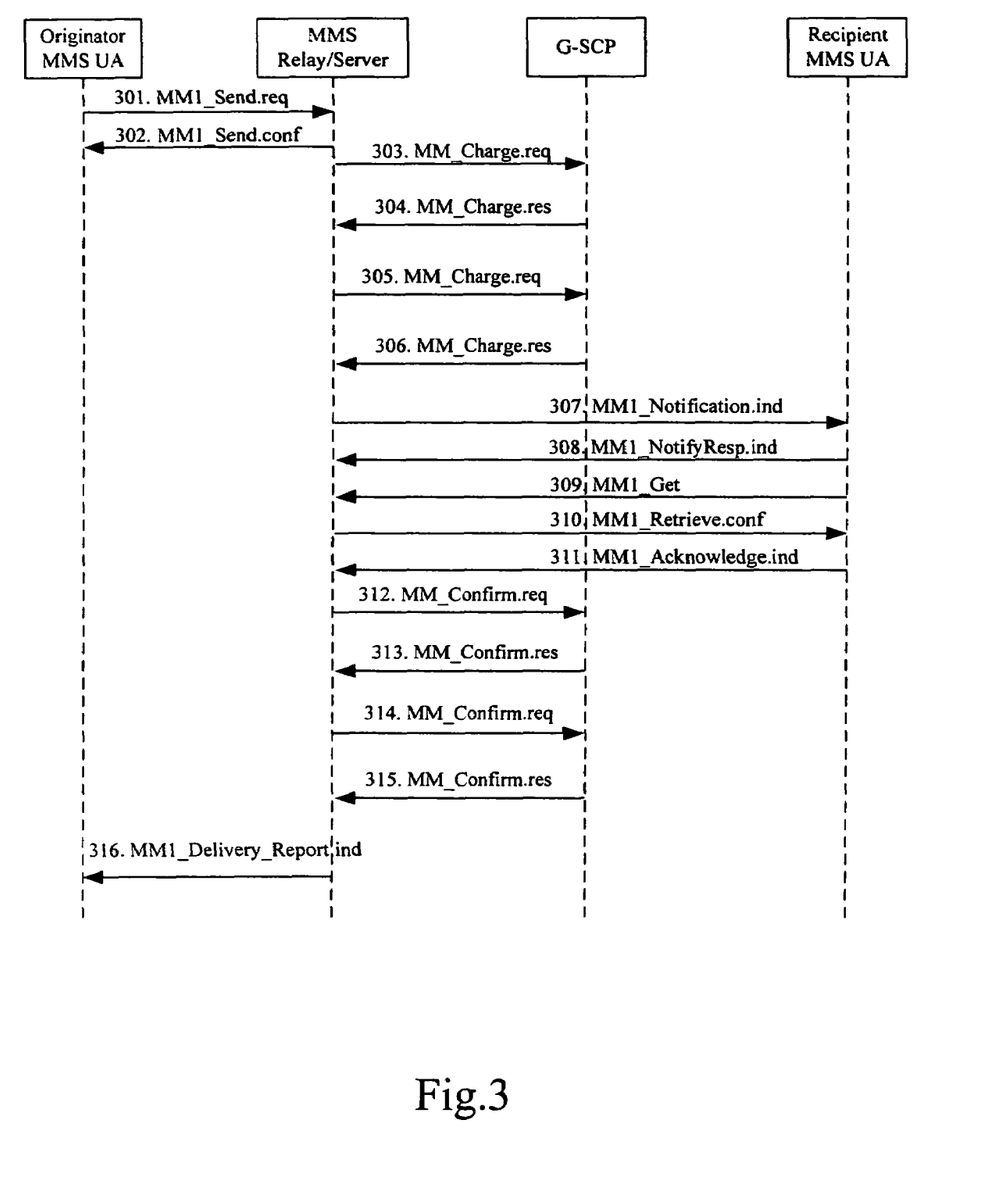
FIG. 3 is a flow diagram of the service processing from non-forwarding terminal to terminal according to the present invention.

FIG. 3 is a flow diagram of the service processing from non-forwarding terminal to terminal, which is suitable to describe the message processing procedure from non-forwarding terminal to terminal in the prepaid MMS, in which the originator terminal and recipient terminal of the multimedia message register in the same MMSC, and multimedia message doesn't need to be forwarded between different MMSCs. Now referring to FIG. 3, the processing procedure of the multimedia message under this condition comprises the following steps.

In steps 301~302, after the calling subscriber submits a multimedia message through originator MMS UA which is the agent of the calling subscriber, the message is forwarded to the originator MMSC via WAP GW and redirector. In particular, the message is forwarded to the MMS Relay/Server entity. Then, the MMSC returns confirmation information MM1_Send.conf after receiving the message. Because the calling and called subscribers belong to the same MMSC in the service from non-forwarding terminal to terminal, the MMSC is directly referred as the current MMSC in the following steps.

In steps 303~304, the current MMSC sends authentication and charge request message for originator MM_Charge.req to G-SCP; the G-SCP then makes authentication and prepayment operation, accomplishing functions of checking whether the operation of charging by piece is repeated or not and payment by piece. After authentication and prepayment have been completed, the G-SCP will return authentication and charge request response message MM_Charge.res to MMSC, wherein the stat field in the response message MM_Charge.res indicates payment result. If the stat field indicates the payment operation is successful, then G-SCP will ask the MMSC to distribute the multimedia message.

In steps 305~306, the current MMSC sends authentication and charge request message for recipient MM_Charge.req to G-SCP; the G-SCP then makes authentication and prepayment operation, accomplishing functions of checking whether the operation of charging by piece is repeated or not and payment by piece. After authentication and prepayment have been completed, the G-SCP will return authentication and charge request response message MM_Charge.res to MMSC, wherein the stat field in the response message MM_Charge.res indicates payment result. If the stat field indicates the payment operation is successful, then G-SCP will ask the current MMSC to distribute the multimedia message.

In steps 307~311, the current MMSC distributes the multimedia message to the called subscriber via the recipient MMS UA which is the agent of the called subscriber. After receiving the message, the called subscriber will send confirmation MM1_Acknowledge.ind to the current MMSC via the recipient MMS UA.

In steps 312~313, after making sure that the recipient has received the multimedia message, the current MMSC will send charge confirmation request message for recipient MM_Confirm.req to G-SCP. G-SCP then checks and makes deduction operation on the traffic, and returns charge confirmation request response message MM_Confirm.res to the current MMSC, with the stat field in the response message MM_Charge.res indicating the payment result.

In steps 314~315, after making sure that the recipient has received the multimedia message, the current MMSC will send charge confirmation request message for originator MM_Confirm.req to G-SCP. G-SCP confirms payment and checking and deduction operation on the traffic, and returns charge confirmation request response message MM_Confirm.res to the current MMSC, with the stat field in the response message MM_Charge.res indicating the payment result.

In step 316, the current MMSC sends a delivery report to the originator via the originator MMS UA.

Disposal of the Abnormal Circumstances:

1) If the current MMSC has not received authentication and charge request response message from SCP in preset time period after sending authentication and charge request message to SCP, the MMSC will instantly terminate providing service to the current multimedia message, and send a delivery report to the originator, informing the originator that distributing of the multimedia message is denied because it is failed to pass the authentication and charge at SCP.

2) If the current MMSC can not receive charge confirmation request response message, the "symbol for charge confirmation" field in the bill will be set at "unconfirmed", and then the multimedia message will be processed in term of non-prepaid MMS subscriber.

Figure 4:
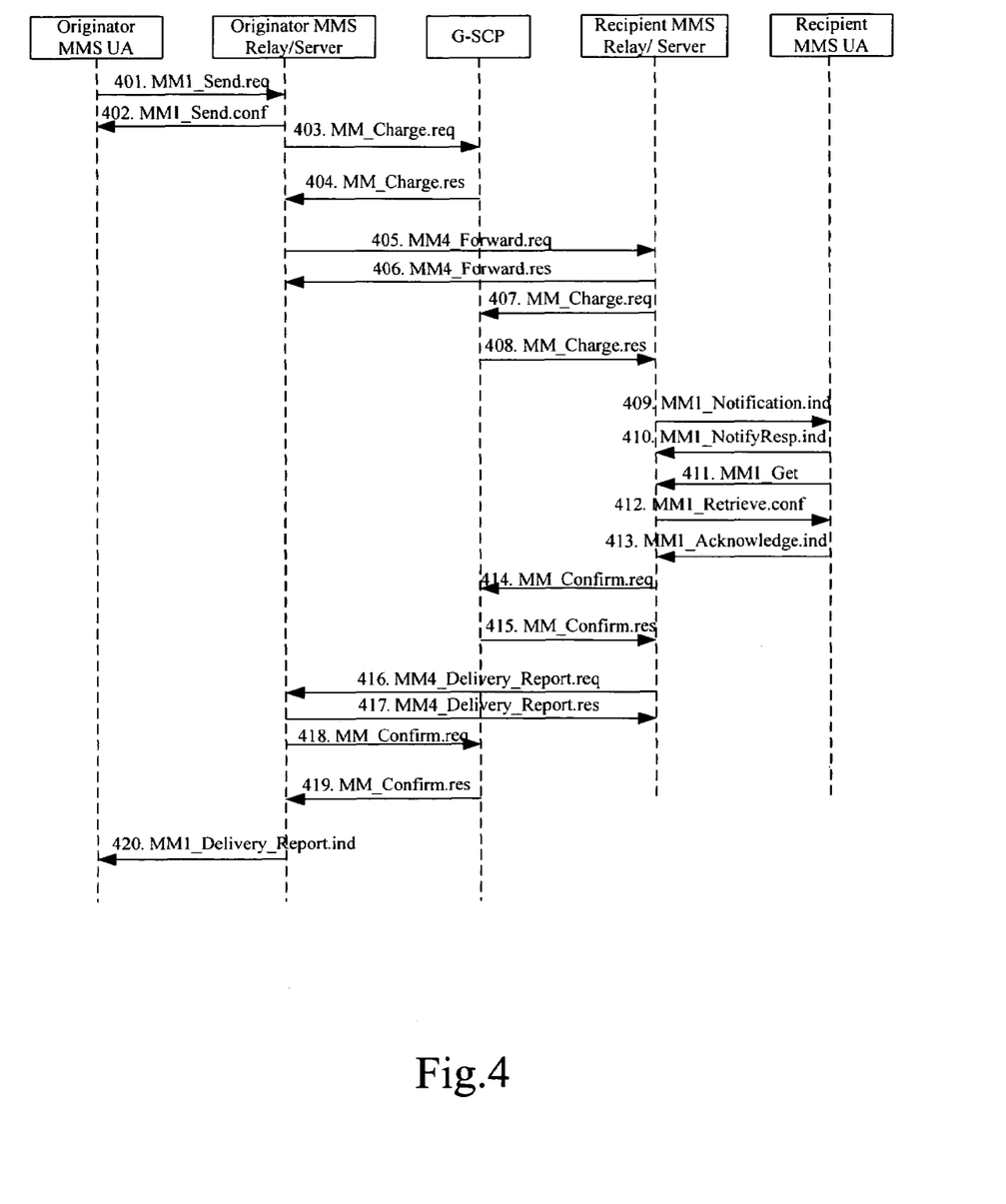
FIG. 4 is a flow diagram of the service processing from forwarding terminal to terminal according to the present invention.

FIG. 4 is a flow diagram of the service processing from forwarding terminal to terminal, which is suitable to describe the message processing procedure from forwarding terminal to terminal in the prepaid MMS, in which the originator terminal and recipient terminal of the multimedia message register in different MMSCs, and multimedia message needs to be forwarded between different MMSCs. Now referring to FIG. 4, the processing procedure of the multimedia message under this condition comprises the following steps.

In steps 401~402, after the calling subscriber submits a multimedia message through originator MMS UA which is the agent of the calling subscriber, the message is forwarded to the originator MMSC via WAP GW and redirector. In particular, the message is forwarded to the MMS Relay/Server entity. Then, the originator MMSC returns confirmation message MM1_Send.conf after receiving the message.

In steps 403~404, the originator MMSC sends authentication and charge request message for originator MM_Charge.req to G-SCP; the G-SCP then makes authentication and prepayment operation, accomplishing functions of checking whether the operation of charging by piece is repeated or not and payment by piece. After authentication and prepayment have been completed, the G-SCP will return authentication and charge request response message MM_Charge.res to the originator MMSC, wherein the stat field in the response message MM_Charge.res indicates payment result. If the stat field indicates the payment operation is successful, then G-SCP will ask the originator MMSC to forward the multimedia message.

In steps 405~406, the originator MMSC forwards the received multimedia message to the recipient MMSC via forwarding message MM4_Forward.req. In particular, the message is forwarded to the recipient MMS Relay/Server entity. Then, the recipient MMSC returns response message MM4_Forward.res after receiving the message.

In steps 407~408, the recipient MMSC sends authentication and charge request message for recipient MM_Charge.req to G-SCP; the G-SCP then makes authentication and prepayment operation, accomplishing functions of checking whether the operation of charging by piece is repeated or not and payment by piece. After authentication and prepayment have been completed, the G-SCP will return authentication and charge request response message MM_Charge.res to MMSC, wherein the stat field in the response message MM_Charge.res indicates payment result. If the stat field indicates the payment operation is successful, then G-SCP will ask the recipient MMSC to distribute the multimedia message.

In steps 409~413, the recipient MMSC distributes the multimedia message to the called subscriber via recipient MMS UA. After receiving the message, the called subscriber will send confirmation message MM1_Acknowledge.ind to the recipient MMSC via the recipient MMS UA.

In steps 414~415, after making sure that the called subscriber has received the multimedia message, the recipient MMSC will send charge confirmation request message for recipient MM_Confirm.req to G-SCP. G-SCP then checks and makes deduction operation on the traffic, and returns charge confirmation request response message MM_Confirm.res to the recipient MMSC, with the stat field in the response message MM_Charge.res indicating the payment result.

In steps 416~417, the recipient MMSC forwards a delivery report MM4_Delivery_Report.req to the originator MMSC. The originator MMSC returns a response message MM4_Delivery_Report.res after receiving the delivery report.

In steps 418~419, after making sure that the called subscriber has received the multimedia message, the originator MMSC will send charge confirmation request message for originator MM_Confirm.req to G-SCP. G-SCP confirms payment and checking and deduction operation on the traffic, and returns charge confirmation request response message MM_Confirm.res to the originator MMSC, with the stat field in the response message MM_Charge.res indicating the payment result.

In step 420, the originator MMSC sends a delivery report MM1_Delivery_Report.ind to the originator via the originator MMS UA.

Disposal of the Abnormal Circumstances:

1) If the originator MMSC has not received authentication and charge request response message from SCP in preset time period after sending authentication and charge request message to SCP, the originator MMSC will instantly terminate providing service to the current multimedia message, and send a delivery report to the originator, informing the originator that distributing of the multimedia message is denied because it is failed to pass the authentication and charge at SCP.

2) If the originator MMSC can not receive charge confirmation request response message, the "symbol for charge confirmation" field in the bill will be set as "unconfirmed", and then the multimedia message will be processed in term of non-prepaid MMS subscriber.

Figure 5:
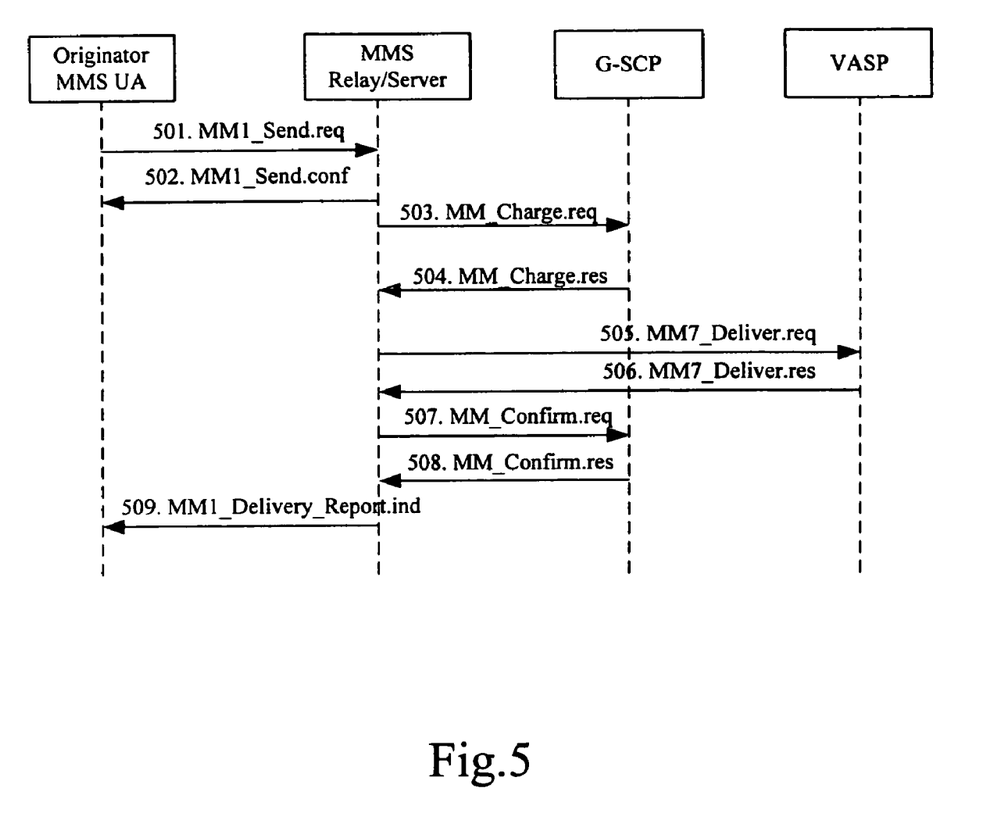
FIG. 5 is a flow diagram of the service processing from terminal to application according to the present invention.

FIG. 5 is a flow diagram of the service processing from terminal to application, which is suitable to describe the calling procedure from terminal to VASP in the prepaid MMS. Now referring to FIG. 5, the processing procedure of the multimedia message under this condition comprises the following steps.

In steps 501~502, after the calling subscriber submits a multimedia message through originator MMS UA, the message is forwarded to the originator MMSC via WAP GW and redirector. In particular, the message is forwarded to the originator MMS Relay/Server entity. Then, the originator MMSC returns confirmation message MM1_Send.conf after receiving the message.

In steps 503~504, the current MMSC sends authentication and charge request message for originator MM_Charge.req to G-SCP; the G-SCP then makes authentication and prepayment operation, accomplishing functions of checking whether the operation of charging by piece is repeated or not and payment by piece. After authentication and prepayment have been completed, the G-SCP will return authentication and charge request response message MM_Charge.res to the current MMSC, wherein the stat field in the response message MM_Charge.res indicates payment result. If the stat field indicates the payment operation is successful, then G-SCP will ask the current MMSC to forward the multimedia message.

In steps 505~506, the current MMSC forwards the multimedia message to VASP through MM7_Delivery.req. Then, the VASP returns response message MM7_Delivery.res after receiving the message.

In steps 507~508, after making sure that the VASP has received the multimedia message, the current MMSC will send charge confirmation request message for recipient MM_Confirm.req to G-SCP. G-SCP then checks and makes deduction operation on the traffic, and returns charge confirmation request response message MM_Confirm.res to the current MMSC, with the stat field in the response message MM_Charge.res indicating the payment result.

In step 509, the current MMSC sends a delivery report MM1_Delivery_Report.ind to the originator via the originator MMS UA.

Disposal of the Abnormal Circumstances:

1) If the current MMSC has not received authentication and charge request response message from SCP in preset time period after sending authentication and charge request message to SCP, the originator MMSC will instantly terminate providing service to the current multimedia message, and send a delivery report to the originator, informing the originator that distributing of the multimedia message is denied because it is failed to pass the authentication and charge at SCP.

2) If the current MMSC can not receive charge confirmation request response message, the "symbol for charge confirmation" field in the bill will be set as "unconfirmed", and then the multimedia message will be processed in term of non-prepaid MMS subscriber.

Figure 6:
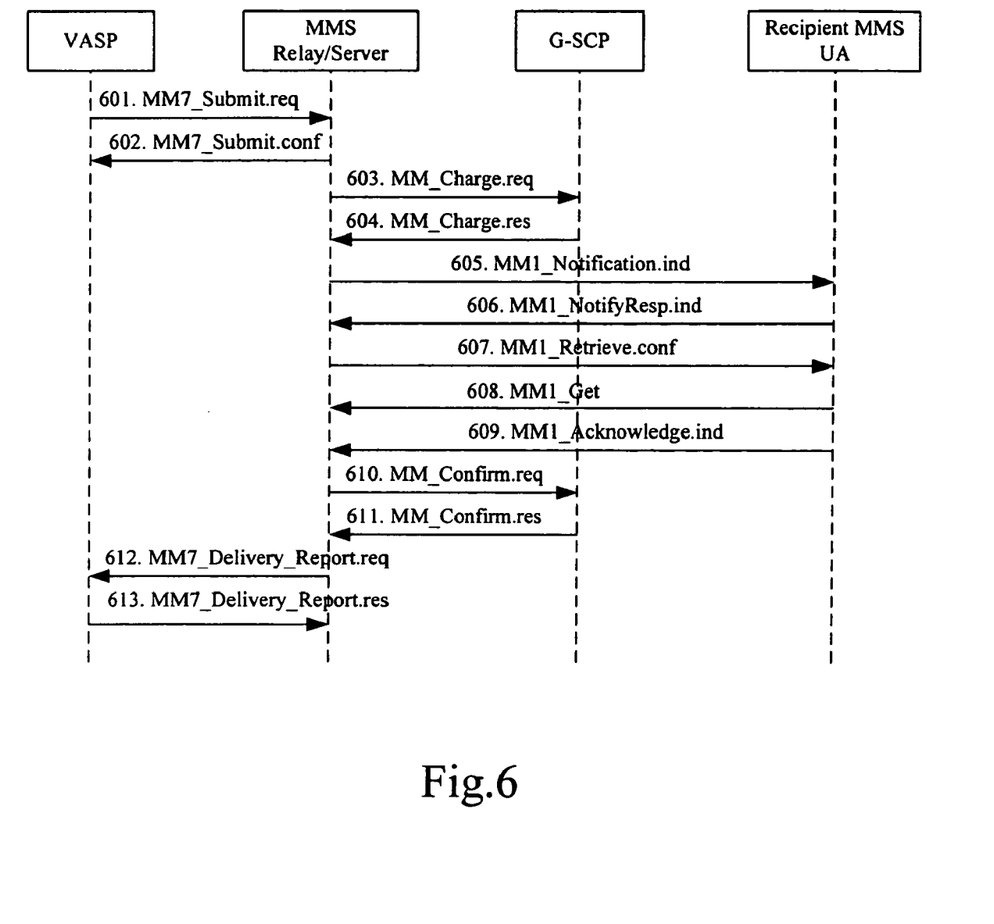
FIG. 6 is a flow diagram of the service processing from application to terminal according to the present invention.

FIG. 6 is a flow diagram of the service processing from application to terminal, which is suitable to describe the calling procedure from VASP to prepaid MMS terminal. Now referring to FIG. 6, the processing procedure of the multimedia message under this condition comprises the following steps.

In steps 601~602, VASP submits a multimedia message to the recipient MMSC, in particular, to the MMS Relay/Server entity. Then, the recipient MMSC returns confirmation message MM7_Submit.conf after receiving the message.

In steps 603~604, the recipient MMSC sends authentication and charge request message for recipient MM_Charge.req to G-SCP. The functions which can be accomplished based on the message includes: checking whether the operation of charging by piece is repeated or checking whether the operation of charging by month is repeated, and implementing deduction operation by piece or by month. Here, charging by either piece or month depends on whether the monthly service is adopted. The G-SCP then makes authentication and prepayment operation. After authentication and prepayment have been completed, the G-SCP will return authentication and charge request response message MM_Charge.res to the recipient MMSC, wherein the stat field in the response message MM_Charge.res indicates payment result. If the stat field indicates the payment operation is successful, then G-SCP will ask the recipient MMSC to distribute the multimedia message.

In steps 605~609, the recipient MMSC forwards the multimedia message to recipient through recipient MMS UA. Then, the recipient sends confirmation message MM1_Acknowledge.ind to the recipient MMSC through the recipient MMS UA.

In steps 610~611, after making sure that the recipient terminal has received the multimedia message, the recipient MMSC will send charge confirmation request message for recipient MM_Confirm.req to G-SCP. G-SCP then checks and makes deduction operation on the traffic, and returns charge confirmation request response message MM_Confirm.res to the recipient MMSC, with the stat field in the response message MM_Charge.res indicating the payment result.

In steps 612~613, the recipient MMSC sends a delivery report MM7_Delivery_Report.req to VASP. After receiving the delivery report, the VASP returns response MM7_Delivery_Report.res.

Disposal of the Abnormal Circumstances:

1) If the recipient MMSC has not received authentication and charge request response message from SCP in preset time period after sending authentication and charge request message to SCP, the recipient MMSC will instantly terminate providing service to the current multimedia message, and send a delivery report to the originator, informing the originator that distributing of the multimedia message is denied because it is failed to pass the authentication and charge at SCP.

2) If the recipient MMSC can not receive charge confirmation request response message, the "symbol for charge confirmation" field in the bill will be set as "unconfirmed", and then the multimedia message will be processed in term of non-prepaid MMS subscriber.

The working flow for E-mail application and SP application are similar with the procedures mentioned above in the present invention, the only difference is that the multimedia message is sent via different interfaces. Interaction between MMSC and E-mail server adopts SMTP protocol.

The present invention provides an effective solution for prepaid MMS, which can solve the problem about prepayment interface in prepaid MMS, i.e., solve the problem about interface protocol between MMSC and SCP and definition of message structure. The present invention can realize the service processing of message interaction between terminal and terminal or terminal and application in prepaid MMS also. In addition, it solves the problem about charge principle for prepaid MMS and the problem about how to realize charge mechanism for prepaid MMS. On the whole, the present invention provides an excellent technical solution for the smooth development of the prepaid MMS.

Of course, the definition of message structure and detailed realizing methods in the present invention can be accomplished and enriched with other relevant fields and steps according to corresponding requirements. In a word, the forgoing embodiment is merely exemplary and is not to be construed as limiting the present invention. The description of the present invention is intended to be illustrative, and not to limit the scope of the claims. Many alternatives, modifications, and variations will be apparent to those skilled in the art.

The invention claimed is:

1. A method for implementing a prepaid Multimedia Messaging Service (MMS), comprising:
   A) a calling subscriber submitting a multimedia message to a Multimedia Messaging Service Center (MMSC);
   B) said MMSC judging the addresses of the calling subscriber and the called subscriber who will receive the multimedia message, and determining whether a user type of each of the calling subscriber and the called subscriber is terminal or application; and
   C) based on the user types of the calling subscriber and the called subscriber, the user types being used for determining which MMSC sends a charge request message, an originator MMSC and/or a recipient MMSC implementing charge processing for the calling subscriber and the called subscriber and distribution of the multimedia message through sending the charge request message to a Service Control Point (SCP).

2. The method of claim 1, the step C further comprising:
C1) judging whether both the calling subscriber and the called subscriber are terminals and register in the same MMSC, when both the calling subscriber and the called subscriber are terminals and register in the same MMSC, going to step C2; otherwise, when the calling subscriber and the called subscriber are terminals but register in different MMSCs, going to step C3; when the calling subscriber is terminal and the called subscriber is application, going to step C4; when the calling subscriber is application and the called subscriber is terminal, going to step C5;
C2) the MMSC in which both the calling subscriber and the called subscriber register distributing the multimedia message, and sending an authentication and charge request message to the SCP to implement charge processing for the calling subscriber and the called subscriber, and then going to step C6;
C3) the recipient MMSC distributing the multimedia message, the originator MMSC sending authentication and charge request messages to the SCP to implement charge processing for the calling subscriber, and the recipient MMSC sending authentication and charge request messages to the SCP to implement charge processing for the called subscriber, and then going to step C6;
C4) the originator MMSC distributing the multimedia message, and sending an authentication and charge request message to the SCP to implement charge processing for the calling subscriber, and then going to step C6;
C5) the recipient MMSC distributing the multimedia message, and sending an authentication and charge request message to the SCP to implement charge processing for the called subscriber, and then going to step C6; and
C6) the originator MMSC returning a delivery report to the calling subscriber.

3. The method of claim 2, step C2 further comprising:
C21) the MMSC sending an authentication and charge request message for an originator to the SCP, the SCP then implementing authentication and prepayment operation for the originator, and returning an authentication and charge request response message to the MMSC;
C22) the MMSC sending an authentication and charge request message for a recipient to the SCP, the SCP then implementing authentication and prepayment operation for the recipient, and returning an authentication and charge request response message to the MMSC;
C23) the MMSC distributing the multimedia message to the called subscriber;
C24) after confirming that the called subscriber has received the multimedia message, the MMSC sending a charge confirmation request for the recipient to the SCP, the SCP implementing verification and subtraction for traffic, and returning a charge confirmation request response; and
C25) after confirming that the called subscriber has received the multimedia message, the MMSC sending a charge confirmation request for the originator to the SCP, the SCP implementing verification and subtraction for traffic, and returning a charge confirmation request response to the MMSC.

4. The method of claim 3, step C3 further comprising:
C31) the originator MMSC sending an authentication and charge request message for an originator to the SCP, the SCP then implementing authentication and prepayment operation for the calling subscriber, and returning an authentication and charge response message to the originator MMSC;
C32) the originator MMSC forwarding the received multimedia message to the recipient MMSC;
C33) the recipient MMSC sending an authentication and charge request message for a recipient to the SCP, the SCP then implementing authentication and prepayment operation for the called subscriber, and returning an authentication and charge request response message to the recipient MMSC;
C34) the recipient MMSC distributing the received multimedia message to the called subscriber;
C35) after confirming that the called subscriber has received the multimedia message, the recipient MMSC sending a charge confirmation request message for the recipient to the SCP, the SCP implementing verification and subtraction for traffic, and returning a charge confirmation request response message to the recipient MMSC;
C36) the recipient MMSC sending a forwarding delivery report to the originator MMSC; and
C37) after confirming that the called subscriber has received the multimedia message, the originator MMSC sending a charge confirmation request message for the originator to the SCP, the SCP confirming deduction operation and implementing verification and subtraction for traffic, and returning a charge confirmation request response message to the originator MMSC.

5. The method of claim 2, step C4 further comprising:
C41) the MMSC sending an authentication and charge request message for an originator to the SCP, the SCP then implementing authentication and prepayment operation and returning an authentication and charge request response message to the MMSC;
C42) the MMSC sending the multimedia message to an application; and
C43) after confirming that the application has received the multimedia message, the MMSC sending a charge confirmation request message for the originator to the SCP, the SCP implementing deduction operation and implementing verification and subtraction for traffic, and returning a charge confirmation request response message to the MMSC.

6. The method of claim 2, step C5 further comprising:
C51) the recipient MMSC sending an authentication and charge request message for a recipient to the SCP, the SCP then implementing authentication and prepayment operation and returning an authentication and charge request response message to the recipient MMSC;
C52) the recipient MMSC distributing the multimedia message to the called subscriber; and
C53) after confirming that the called subscriber has received the multimedia message, the recipient MMSC sending a charge confirmation request message for the recipient to the SCP, the SCP implementing verification and subtraction for traffic, and returning a charge confirmation request response message to the recipient MMSC.

7. The method of claim 2, wherein said authentication and charge request message includes one or more than one of the following fields: dialogue ID, identification of content provider, service code and business code, message ID, identification of the originator MMSC forwarding the multimedia message, identification of the originator or recipient MMSC sending charge request to the SCP, priority of the multimedia message, type of a multimedia message destination number, coding plan of the multimedia message destination number, address of the multimedia message destination number, charge number, charge rate, charge type, bill type and discount.

8. The method of claim 3, wherein said authentication and charge request response message includes: dialogue ID and a field indicating success or failure of charge operation.

9. The method of claim 4, wherein said authentication and charge request response message includes: dialogue ID and a field indicating success or failure of charge operation.

10. The method of claim 5, wherein said authentication and charge request response message includes: dialogue ID and a field indicating success or failure of charge operation.

11. The method of claim 6, wherein said authentication and charge request response message includes: dialogue ID and a field indicating success or failure of charge operation.

12. The method of claim 3, wherein said charge confirmation request message includes one or more than one of the following fields: dialogue ID, message ID, the number of a mobile phone to be charged, address of a multimedia message destination number, status value indicating success or failure of sending the multimedia message, identification of the MMSC sending charge request to the SCP and the traffic size of the content.

13. The method of claim 4, wherein said charge confirmation request message includes one or more than one of the following fields: dialogue ID, message ID, the number of a mobile phone to be charged, address of a multimedia message destination number, status value indicating success or failure of sending the multimedia message, identification of the original or recipient MMSC sending charge request to the SCP and the traffic size of the content.

14. The method of claim 5, wherein said charge confirmation request message includes one or more than one of the following fields: dialogue ID, message ID, the number of a mobile phone to be charged, address of a multimedia message destination number, status value indicating success or failure of sending the multimedia message, identification of the original or recipient MMSC sending charge request to the SCP and the traffic size of the content.

15. The method of claim 6, wherein said charge confirmation request message includes one or more than one of the following fields: dialogue ID, message ID, the number of a mobile phone to be charged, address of a multimedia message destination number, status value indicating success or failure of sending the multimedia message, identification of the original or recipient MMSC sending charge request to the SCP and the traffic size of the content.

16. The method of claim 3, wherein said charge confirmation request response message includes: dialogue ID and a field indicating success or failure of charge operation.

17. The method of claim 4, wherein said charge confirmation request response message includes: dialogue ID and a field indicating success or failure of charge operation.

18. The method of claim 5, wherein said charge confirmation request response message includes: dialogue ID and a field indicating success or failure of charge operation.

19. The method of claim 6, wherein said charge confirmation request response message includes: dialogue ID and a field indicating success or failure of charge operation.

20. The method of claim 3, further comprising: the MMSC terminating providing service to the multimedia message and sending a delivery report to the calling subscriber if it did not receive the authentication and charge request response from the SCP in preset time period after sending the authentication and charge request to the SCP.

21. The method of claim 4, further comprising: the original or recipient MMSC terminating providing service to the multimedia message and sending a delivery report to the calling subscriber if it did not receive the authentication and charge request response from the SCP in preset time period after sending the authentication and charge request to the SCP.

22. The method of claim 5, further comprising: the original or recipient MMSC terminating providing service to the multimedia message and sending a delivery report to the calling subscriber if it did not receive the authentication and charge request response from the SCP in preset time period after sending the authentication and charge request to the SCP.

23. The method of claim 6, further comprising: the original or recipient MMSC terminating providing service to the multimedia message and sending a delivery report to the calling subscriber if it did not receive the authentication and charge request response from the SCP in preset time period after sending the authentication and charge request to the SCP.

24. The method of claim 3, further comprising: the MMSC setting a "symbol of charge confirmation" field in a bill at "unconfirmed" and processing the multimedia message in a way of non-prepaid MMS subscriber if it did not receive the charge confirmation request response message.

25. The method of claim 4, further comprising: the original or recipient MMSC setting a "symbol of charge confirmation" field in a bill at "unconfirmed" and processing the multimedia message in a way of non-prepaid MMS subscriber if it did not receive the charge confirmation request response message.

26. The method of claim 5, further comprising: the original or recipient MMSC setting a "symbol of charge confirmation" field in a bill at "unconfirmed" and processing the multimedia message in a way of non-prepaid MMS subscriber if it did not receive the charge confirmation request response message.

27. The method of claim 6, further comprising: the original or recipient MMSC setting a "symbol of charge confirmation" field in a bill at "unconfirmed" and processing the multimedia message in a way of non-prepaid MMS subscriber if it did not receive the charge confirmation request response message.

28. A method for implementing a prepaid Multimedia Messaging Service (MMS), comprising:
submitting, by a calling subscriber, a multimedia message to a Multimedia Messaging Service Center (MMSC);
judging, by the MMSC, the addresses of the calling subscriber and the called subscriber who will receive the multimedia message, and determining whether a user type of each of the calling subscriber and the called subscriber is terminal or application; and
when both the calling subscriber and the called subscriber are terminals and register in the same MMSC, distributing, by the MMSC in which both the calling subscriber and the called subscriber register, the multimedia message, and sending an authentication and charge request message to the SCP to implement charge processing for the calling subscriber and the called subscriber, and returning, by the MMSC, a delivery report to the calling subscriber;
when the calling subscriber and the called subscriber are terminals but register in different MMSCs, distributing, by the recipient MMSC, the multimedia message, sending, by the originator MMSC and the recipient MMSC, authentication and charge request messages to the SCP respectively to implement charge processing for the calling subscriber and the called subscriber, and returning, by the recipient MMSC, a delivery report to the calling subscriber;

when the calling subscriber is terminal and the called subscriber is application, distributing, by the originator MMSC, the multimedia message, and sending, by the originator MMSC, an authentication and charge request message to the SCP to implement charge processing for the calling subscriber, and returning, by the originator MMSC, a delivery report to the calling subscriber;

when the calling subscriber is application and the called subscriber is terminal, distributing, by the recipient MMSC, the multimedia message, and sending, by the recipient MMSC, an authentication and charge request message to the SCP to implement charge processing for the called subscriber, and returning, by the recipient MMSC, a delivery report to the calling subscriber.

* * * * *